United States Patent [19]
Lüssi et al.

[11] 3,865,814
[45] Feb. 11, 1975

[54] PROCESS FOR PREPARING N-SUBSTITUTED LACTAMS

[75] Inventors: Heinz Lüssi; Clau Berther, both of Chur/Gr; Josef Studinka, Zurich, all of Switzerland

[73] Assignee: Inventa AG fur Forschung und Patentverwertung, Zurich, Switzerland

[22] Filed: July 25, 1973

[21] Appl. No.: 382,461

[30] Foreign Application Priority Data
July 28, 1972 Switzerland.................. 11327/72

[52] U.S. Cl.............. 260/239.3 R, 260/293.86, 260/326.5 FL
[51] Int. Cl............................................. C07d 41/06
[58] Field of Search...........260/239.3 R, 293.86, 326.5 FL

[56] References Cited
UNITED STATES PATENTS
3,661,894  5/1972  Wehner et al. ............. 260/239.3 A

OTHER PUBLICATIONS
Tafel et al., "Chem. Ber.," Vol. 40, (1907).

Primary Examiner—Henry R. Jiles
Assistant Examiner—Robert T. Bond
Attorney, Agent, or Firm—Bierman & Bierman

[57] ABSTRACT

A process for the preparation of N-substituted lactams of the formula

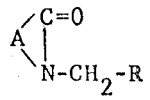

wherein A is a substituted or unsubstituted aliphatic hydrocarbon chain having 3 to 11 carbon atoms, said substituents comprising one or more alkyl groups each having 1 to 4 carbon atoms; and R is hydrogen or a hydrocarbon radical having 1 to 17 carbon atoms, comprising reacting at least one starting lactam of the formula

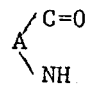

with an organic halogen compound of the formula
$X - CH_2 - R$
wherein X is chlorine, bromine or iodine, in the presence of an alkali metal hydroxide in solid form or in at least 50% aqueous solution at a reaction temperature of from 20°C to 120°C.

15 Claims, No Drawings

PROCESS FOR PREPARING N-SUBSTITUTED LACTAMS

This application claims the priority of Swiss application 11327 filed July 28, 1972.

The present invention relates to a process for preparing N-substituted lactams by condensation of N-unsubstituted lactams with primary alkyl or aralkyl halides in the presence of a strong inorganic base.

A method for preparing N-alkyllactams which has been known for a long time is based on the reaction of alkali lactamates with alkylating agents (L. Ruzicka, Helv.Chim.Acta 4, 472 (1921); C. S. Marval and W. W. Moyer, J. org.Chem. 22, 1065 (1957); R. M. Moriarty, J. org. Chem. 29, 2748 (1964). The alkali lactamates required for the purpose were prepared in advance in each case by reacting the alkali metals or the alkali metal hydrides with the corresponding lactams in the presence of an inert solvent. In consequence of reduction by the nascent hydrogen formed and in consequence of condensation under the influence of the strongly basic medium, however, by-products which impair the purity and the yield of the N-alkyllactam subsequently produced are formed. (A. Ciaperoni, L. Mariani and G. B. Gechele, Chim. Ind. (Milan) 50, 772 (1968)). Moreover, this method is uneconomic in consequence of the use of the costly alkali metals or alkali metal hydrides.

An appreciable advance compared with this conventional laboratory method is found in the paper by G. L. Isele and A. Lüttringhaus (Synthesis 1971, 266). The authors describe the alkylation of caprolactam with n-butyl bromide, benzyl chloride or octadecyl chloride in the presence of dimethyl sulfoxide as solvent and potassium hydroxide as hydrogen halide acceptor. The authors attribute their results to a specific action of the dimethyl sulfoxide employed by them as solvent, namely to a marked promotion of the formation of the potassium salts of the amides used. In spite of its advantages when compared with older methods, this process is not really suitable for commercial use on a large scale. The yields (which amount to 70 to 83%), the use of relatively costly potassium hydroxide, and the simultaneous use of large amounts of a somewhat exotic solvent are detrimental to its economy.

Surprisingly, it has now been found that lactams, even in the absence of solvents, can be alkylated with high yields using primary alkyl or aralkyl halides and with alkali metal hydroxides as hydrogen halide acceptors.

The lactams which can be used according to the present invention are compounds of the following general formula:

A is an aliphatic hydrocarbon chain with 3 to 11 carbon atoms. This chain may carry one or more straight-chain or branched alkyl groups each with up to 4 carbon atoms as substituents.

Examples of such lactams are:

Pyrrolidone, piperidone, γ-t.butyl caprolactam, the commercial isomer mixture of β,β,δ-and β,δ,δ-trimethylcaprolactam, oenantholactam, capryllactam, caprinlactam, laurinlactam and in particular caprolactam.

The alkylating agents which can be employed according to the present invention are compounds of the following general formula:

X is chlorine, bromine or iodine and is preferably chlorine. R is hydrogen or a hydrocarbon radical with 1 to 17 carbon atoms. This hydrocarbon radical may consist of straight or branched aliphatic chains or of alicyclic or aromatic rings. It may contain all these elements in any combination and, moreover, olefinic double bonds. Examples of such organic halogen compounds are:

Methyl chloride, ethylchloride, n-butyl bromide, octadecyl iodide, allyl chloride, methallyl chloride, bromomethylcyclohexane, benzyl chloride, 2-chloromethylnaphthalene and 3-(p-methylphenyl)propyl bromide. Preferably, R-CH$_2$— is a methyl, ethyl, allyl or benzyl group.

Suitable as bases splitting off hydrogen halide, according to the present invention, are in particular the hydroxides of the alkali metals. For economic reasons, sodium hydroxide is generally preferred. Remarkably, in fact, this cheap base is also suitable for performing the simple process according to the invention in by far the majority of cases, whereas Isele and Lüttringhaus (loc.cit.) were only able to use potassium hydroxide for their more expensive method.

The reaction forming the basis of the process according to the invention proceeds in accordance with the following equation:

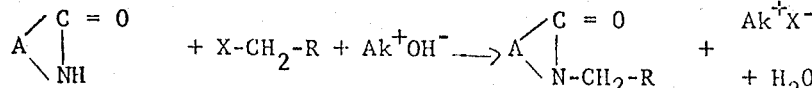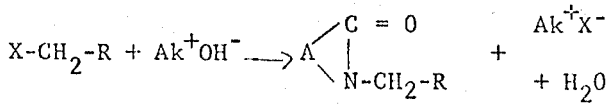

A, X, R having the significances previously mentioned and Ak$^+$ standing for an alkali metal cation.

As is apparent from this equation, the three starting products, the lactam, halogen compound and alkali metal hydroxide, react with one another in equimolar amounts. When the process according to the invention is carried out, however, complete conversion is not always achieved. In practice, it often proves to be an advantage if the conversion of at least one constituent is as complete as possible. This can be achieved by using one or even two of the constituents in excess. One mol of the lactam is preferably reacted with 0.5 to 5 mols of the organic halogen compound and with 0.5 to 2 mols of the alkali metal hydroxide.

In the preferred method of carrying out the present process of the invention, the lactam and the organic halogen compound are first put in the reaction vessel and heated. The alkali metal hydroxide is added at such rate that, when the reaction temperature is reached, the heat of reaction which is released can be removed. The reverse procedure, that is, putting the base in first together with the lactam and then adding the alkylating agent often has an unfavorable effect on the yields.

The alkali hydroxide may readily be used in solid form. It is dissolved without difficulty during the reaction with precipitation of the corresponding alkali halide. Out of purely practical considerations, however, it will frequently be preferred to add the base in the form of an aqueous solution. With this method, however, it must be taken into consideration that as the amount of water added increases both the reaction velocities and the yields obtained decrease. For these reasons, a solution of the base which is diluted more than 50% is not advisable. With the more advantageous use of more concentrated solutions of alkali hydroxide, for example 73% sodium hydroxide, heated supply vessels and feed piping should be provided in order to prevent the base from crystallizing out.

The reaction temperatures which can be employed lie within the range of 20° to 120°C. At higher temperatures, secondary reactions make themselves increasingly noticeable. At temperatures which are too low, the alkylation becomes slow. In many cases, a temperature between 50° and 80°C has proved to be very satisfactory. The optimum reaction temperature in a particular case depends, however, essentially on the nature of the starting products, and in particular the nature of the alkylating agent. In this connection, there apply the generally known rules, according to which the alkyl iodides and, to a lesser extent, the alkyl bromides, are more reactive than the corresponding alkyl chlorides, and according to which halogen compounds with an allyl and benzyl structure are more reactive than those which have no double bond systems or have double bond systems further removed from the halogen atom.

The alkylating reactions carried out according to the present invention are distinctly exothermic, so that the steps known generally to the expert must be taken to control the reaction temperature and to remove the heat of reaction.

The carrying out of the reaction under pressure is advantageous when alkylation is performed with an alkyl halide which is gaseous under normal conditions, such as, for example, methyl chloride. In such cases, the reaction is appreciably accelerated by the use of pressure, the conversion levels and yields are increased, and the reaction time can be shortened accordingly.

Simultaneous use of an inert solvent during the reaction is not necessary and tends to slow down the reaction due to the dilution of the constituents and to increase the cost of recovering the end product. Nevertheless, the addition of an inert liquid of suitable boiling point, such as, for instance, hexane, has proved to be advantageous in some cases because the heat of reaction can be carried off and the water of reaction separated by the boiling liquid. At the same time, not only is it unnecessary for this liquid to be miscible with the reaction mixture, but it is even an advantage for it to be immiscible or only limitedly miscible therewith. For the reasons first mentioned, it is desirable to limit addition of inert liquid to what is absolutely necessary. If necessary, the alkylating agent itself may also take over the function of the inert liquid if its boiling point is in conformity with the desired reaction temperature at the pressure prevailing.

The process according to the invention may also be used for converting lactam mixtures. This fact may be utilized to cause the reaction also of those lactams, such as, for instance, laurinlactam, whose melting points are far above the optimum reaction temperature. In such cases, a lower-melting mixture of this high-melting lactam with a second lactam is used with advantage. During the recovery, the two N-substituted lactams obtained can then be separated by known methods, as for example by distillation.

In another method for converting high-melting lactams, the N-substituted lactam formed in the reaction is added to the starting lactam prior to the reaction in an amount such that a sufficient lowering of the melting point occurs.

In the final reacted mixture there is found unreacted starting products, inert liquid if added, the N-substituted lactam formed, the water added together with the base and the water formed during the reaction, and alkali halide which is precipitated for the most part. They can be separated in very simple manner by distillation after the alkali halide has been filtered off. Preferably, any free alkali hydroxide which may possibly still be present is neutralized beforehand with acid.

The N-substituted lactams prepared in accordance with the invention are valuable solvents, plasticizers and lubricants. Some of them can be polymerized to give valuable plastics (see, for example, Makromol. Chemie 80, pp. 44 et seq. (1964) and Swiss Patent Specification 510,718).

The following Examples are intended to illustrate the present invention without, however, limiting it in any way.

EXAMPLE 1

1130 g of caprolactam (10 mols) are melted at 70°C and saturated with gaseous methyl chloride while stirring vigorously. While passing methyl chloride through without interruption, a 50% sodium hydroxide solution is allowed to drip in and at the same time the reaction vessel is cooled with water at a temperature of 50°C. The rate at which the sodium hydroxide solution drips in is so chosen that the reaction temperature drops to 60°C after 10 minutes. At the same time, common salt begins to precipitate in finely divided form. From this point on, the rate at which the sodium hydroxide is added is so chosen that in spite of the cooling with water at a temperature of 50°C a temperature of 60°C is maintained in the vessel. After 20 minutes, 160 g of 50% sodium hydroxide (2 mols) have been added, 320 g (8 mols) of beads of pure sodium hydroxide are then added portionwise. All the sodium hydroxide has been added within 1¼ hours and 6 mols of methyl chloride have been absorbed. The mixture is allowed to finish reacting for another 6 hours at 60°C. As before, as much methyl chloride as the mixture will absorb is constantly added. Since, with time, the heat of reaction is no longer sufficient to maintain the desired temperature, the external temperature of the reaction vessel must be suitably increased. At the end of the reaction, about 9 mols of methyl chloride have been absorbed and further absorption takes place only extremely slowly.

The liquid and colorless reaction product contains fine crystals of sodium chloride which are filtered with suction and washed three times with 300 ml of benzene in each case. The benzene extracts are evaporated and the residue is combined with the first filtrate to form the product mixture.

Water and the remaining benzene are then driven off from the product mixture at normal pressure and a sump temperature of up to 150°C. Subsequent vacuum distillation at 2 mm Hg yields 1060.6 g. of a liquid fraction passing over between 90°C and 118°C and which consists chiefly of N-methylcaprolactam and still contains considerable amounts of unconverted caprolactam. 110 g of caprolactam are recovered as the last fraction.

Rectification of the N-methylcaprolactam fraction in a Vigreux column 1 meter long yields the following fractions:

| No. | Composition | Weight |
|---|---|---|
| 1 | N-Methylcaprolactam, 99% | 856.7 g |
| 2 | {78.2% N-Methylcaprolactam / 21.8% caprolactam} | 50.2 g |
| 3 | Caprolactam | 145.0 g |

Finally, therefore, from 1130 g of caprolactam used, 895.9 g of N-methylcaprolactam are obtained and 266 g of caprolactam are recovered.

76.5% of the caprolactam used was converted. The yield of N-methylcaprolactam is 92.1% based on the caprolactam consumed.
N-methylcaprolactam b.p = 86 − 88°C (0.8 mm Hg)
$n_D 20 = 1.4839$ It is also possible to operate in exactly the same way at a reaction temperature of 80°C. In this case, 73% of the caprolactam is converted and the N-methylcaprolactam is obtained in a yield of 92.6% based on the caprolactam consumed.

In otherwise exact analogy to the Example which has been described, all the sodium hydroxide may also be added in the form of a 50%, a 60% or a 70% solution or in solid form. The results obtained in this way are summarized hereunder:

| Sodium hydroxide concentration*) | 50% | 60% | 70% | 100% |
|---|---|---|---|---|
| Caprolactam conversion | 62.1% | 63.8% | 71.1% | 76.4% |
| Yield of N-methyl caprolactam (based on caprolactam consumed) | 67.0% | 84.1% | 90.0% | 91.7% |

*) Percent by weight

These results show clearly that both the conversion of caprolactam and the yield of N-methylcaprolactam fall with increasing dilution of the sodium hydroxide solution.

Piperidone, oenantholactam and capryllactam can be converted in similar manner with methyl chloride.

EXAMPLE 2

1,000 g (6.45 mols) of the isomer mixture of β,β,δ- and β,δ,δ-trimethylcaprolactam are melted at 83°C and saturated with methyl chloride while stirring vigorously. During the whole of the rest of the test the stirring is maintained and a little more methyl chloride than is absorbed is constantly passed through. Within half an hour, 258 g (6.45 mols) of sodium hydroxide beads are added in portions. At the same time, with the commencement of the addition, the reaction vessel is cooled with water at a temperature of 50°C, so that the temperature of the mixture falls to 70°C within 15 minutes. After the addition of the alkali has been completed, the mixture is allowed to finish reacting for about another 8 hours at the same temperature. In all, 142.5 liters of methyl chloride are absorbed.

The precipitated common salt is filtered off from the mixture and washed with methanol. The separately collected methanol washing liquor is neutralized with 68 ml of concentrated hydrochloric acid to pH = 7 and then extracted with benzene. The evaporation residue of the benzene extract is distilled together with the main part of the filtered mixture at 0.1 mm Hg. The fraction passing over at 94 to 112°C (894 g) is rectified once more in a 1-meter Vigreux column. 122 g of unconverted lactam pass over between 112°C and 150°C (0.1 mm Hg). The rectification yields the following fractions:

| Boiling point | $n_D 20$ | Amount | Gas chromatography % N-methyl-trimethyl-caprolactam | % Trimethyl-caprolactam |
|---|---|---|---|---|
| 64–68°C/0.1 mm Hg | 1.4713 | 19.7 g | 89.0 | — |
| 68–72°C/0.1 mm Hg | 1.4733 | 21.6 g | 95.3 | — |
| 72–73°C/0.1 mm Hg | 1.4741 | 278.7 g | 99.7 | — |
| 73–74°C/0.1 mm Hg | 1.4743 | 367.1 g | 100.0 | — |
| 74–75°C/0.1 mm Hg | 1.4750 | 81.8 g | 97.5 | 2.5 |
| Residue | m.p.= 65–80°C | 104.5 g | | |

In all, at the end of the reaction there are still 228 g of unconverted trimethylcaprolactam, so that the conversion is 77.5% based on lactam used. 763 g of N-methyltrimethylcaprolactam are formed. From this there is calculated a yield of 90% of the theoretical based on converted trimethylcaprolactam. There is 645.8 g of N-methyltrimethylcaprolactam with a purity of 99.7% or more. The residual N-methyllactam can likewise be isolated in pure form from the first and last fractions by further separating operations, for example by rectification operations.

EXAMPLE 3

400 g (3.54 mols) of caprolactam and 400 g (2.02 mols) of laurinlactam are melted at 90°C and allowed to cool down to 85°C while methyl chloride is introduced with vigorous stirring. The addition of sodium hydroxide in pellet form is then commenced. Immediately thereafter the reaction vessel is cooled with 50° to 55°C water so that the temperature in the reaction mixture is kept at 70° to 74°C. Within 50 minutes, 222 g (5.56 mols) of solid sodium hydroxide are added in portions. The reaction is allowed to continue for another hour at 72°C, whereupon another 80.8 g (2.02 mols) of solid sodium hydroxide are added. At the same time, the temperature of the water bath is increased to 90°C, as a result of which the temperature in the reaction vessel increases to the same level within 45 minutes. A quarter of an hour after the last addition of sodium hydroxide, a second portion of 400 g (2.02 mols) of laurinlactam is added. About 20 minutes later, the temperature of the mixture reaches 88°C, whereupon a third amount of 160 g of sodium hydroxide (4 mols) is added in portions. Finally, the mixture is allowed to finish reacting for another 100 minutes at 90°C and for 4½ hours at 93°–94°C. Throughout the reaction, the mixture is vigorously stirred and an amount of methyl chloride is passed through such that a small excess just escapes from the reaction vessel. In all, 158.5 liters of methyl chloride are absorbed.

After cooling the precipitated sodium chloride and crystallized laurinlactam are filtered off from the mixture and washed with petroleum ether. After extraction of the filter cake with 1.2 liters of boiling water to remove the salt, 167 g of practically pure laurinlactam are recovered.

After evaporation of the petroleum ether, the filtrate is split up into three fractions by distillation:

| No. | Amount | B.p. |
| --- | --- | --- |
| 1 | 456.6 g | 91–100°C/0.5 mm Hg |
| 2 | 173.5 g | 100–112°C/0.2 mm Hg |
| 3 | 323.0 g | 142–163°C/0.3 mm Hg |

183.1 g of impure laurinlactam is left as residue. By recrystallization from ethyl acetate, 124 g of pure lactam is recovered therefrom. A further portion of laurinlactam (48.2 g) is separated from Fraction 3 by filtration and after-washing with petroleum ether.

Fraction 1 is rectified in a 1-meter Vigreux column and split up into the three Fractions 11, 12 and 13 and a residue R 1. Fractions 2 and 3 are separated together in a similar column into Fractions 21, 22 and 23; 62.1 g of laurinlactam being recovered as residue. The amounts and boiling points of these fractions and the compositions thereof determined by gas chromatography are given in Table 1.

EXAMPLE 4

80 g (2 mols) of sodium hydroxide are added within half an hour while stirring vigorously in 4 portions of 20 g each to a mixture of 226 g (2 mols) of caprolactam, 295 g (2.4 mols) of n-propyl bromide and 100 ml of hexane boiling at 70°C. After a short time, the boiling point rises to 75°C, whereupon another 50 ml of hexane are added. On further heating under reflux, the boiling point of the mixture rises again to 80°C after about 5 hours and another 30 ml of hexane are added. The total reaction time is 7 hours. In this time, 30 ml of water of reaction is separated in a separator arranged below the reflux condenser and expelled with the hexane vapor.

The precipitated sodium bromide is filtered off and washed with hexane. After evaporation of the hexane, the filtrate is distilled under vacuum. The main amount (258.5 g) of the product passes over at 91° to 102°C and 0.8 mm Hg. Between 102 and 115°C and 0.8 mm Hg there follows 14.3 g of the last fraction which still contains 65.8% of N-n-propylcaprolactam in addition to 30.5% of caprolactam. In the subsequent rectification of the main amount in a 1-meter Vigreux column, Table 1

| Fraction No. | 11 | 12 | 13 | R 1 | 21 | 22 | 23 |
| --- | --- | --- | --- | --- | --- | --- | --- |
| Amount | 17.4 g | 390.5 g | 11.5 g | 40.3 g | 20.4 g | 291.1 g | 62.9 g |
| Boiling point | 70–2°C/0.3 mm Hg | 72–3°C/0.2 mm Hg | 73–142°C/0.1 mm Hg | — | 85–150°C/0.3 mm Hg | 151–2°C/0.3 mm Hg | 153–160°C/0.3 mm Hg |
| $n_D 20$ | 1.4825 | 1.4831 | 1.4848 | 1.4975 | 1.4830 | 1.4972 | 1.4976 |
| N-methylcaprolactam | 94.4% | 98.5% | 47.5% | — | 47.5% | 0.2% | — |
| Caprolactam | — | — | 2.9% | 0.1% | 0.9% | — | — |
| N-methyllaurinlactam | 2.6% | 1.3% | 49.4% | 89.2% | 51.2% | 98.6% | 89.5% |
| Laurinlactam | 0.1% | 0.2% | 0.2% | 10.7% | 0.1% | 1.2% | 10.2% |
| Impurities | 2.9% | — | — | — | 0.3% | — | 0.3% |

Summing up, it is apparent therefrom that the 400 g of caprolactam used are converted almost completely and that 384 g of the 800 g of laurinlactam (or 48%) are used up. 401 g of laurinlactam of good quality are recovered which can be used again in another charge. Basically, another 15 g can be isolated from Fractions R 1, 22 and 23 by further separation operations. In all, 416 g of N-methylcaprolactam, i.e. 92.5% of the theoretical yield, and 401 g of N-methyllaurinlactam, i.e. 98% of the theoretical yield based on laurinlactam consumed, are formed. The main amounts of these two substances are present in Fractions 12 and 22 with a purity of 98.5%. Of course, further amounts of the N-methyllactams can be isolated by further dividing up of the remaining fractions in the manner hereinbefore described.

the following fractions are obtained:

| Boiling point | Amount | %N-n-propylcaprolactam | % Caprolactam |
| --- | --- | --- | --- |
| 81–88°C/0.8 mm Hg | 10.2 g | 77.9 | 2.2 |
| 88–91°C/0.8 mm Hg | 198.4 g | 93.8 | 5.6 |
| 91–121°C/0.5 mm Hg | 21.8 g | 59.5 | 35.3 |
| Residue | 16.0 g | 2.1 | 97.5 |

In all, 216.6 g of N-n-propylcaprolactam are formed and 39 g of caprolactam are not converted. The yield is 85% based on the converted caprolactam and 70% based on the caprolactam used.

EXAMPLE 5

60 g (1.5 mols) of sodium hydroxide in pellet form are added in portions within 20 minutes while stirring vigorously to a mixture of 170 g (1.5 mols) of caprolactam, 137 g (1.8 mols) of allyl chloride and 80 ml of hexane boiling at 54°C. Thereafter, further heating is carried out under reflux. After a reaction time of 7 hours, the temperature of the boiling mixture has risen to 80°C and 26 ml of water collects in a separator arranged below the reflux condenser and is driven off with the hexane vapor. Finally, hexane and excess allyl chloride are distilled off from the mixture, the sump temperature being increased to 150°C.

Precipitated sodium chloride is filtered out of the reaction product and is washed with methanol. After the methanol has been distilled off, the reaction product is rectified in a 1-meter Vigreux column at 0.5 mm Hg. Almost all the product passes over between 87.5° and 88.5°C and has a refractive index of 1.4924 to 1.4928. Three fractions are separated and exhibit the following physical properties and purity values:

| Boiling point | $n_D 20$ | Amount | Gas chromatography % Allylcaprolactam | % Caprolactam |
|---|---|---|---|---|
| 87.5–88.0°C/0.5 mm Hg | 1.4924 | 155.9 g | 97.8 | 1.9 |
| 88.0–88.5°C/0.5 mm Hg | 1.4928 | 29.0 g | 96.0 | 4.0 |
| 88.5–99.5°C/0.5 mm Hg | 1.4932 | 14.3 g | 88.9 | 11.1 |

Thus, 193.5 g of N-allylcaprolactam are formed and 5.5 g of caprolactam are not converted. The yield, based on converted caprolactam, is 87.5% of theoretical.

EXAMPLE 6

80 g (2 mols) of solid sodium hydroxide in beads is added portionwise, within one hour while stirring vigorously, to a mixture of 310 g (2 mols) of the isomer mixture of $\beta,\beta,\delta$- and $\beta,\delta,\delta$-trimethylcaprolactam, 183 g (2.4 mols) of allyl chloride and 100 ml of hexane boiling at 57°C. Thereafter, heating is carried out for an additional 8 hours under reflux, 14 ml of water being driven off with the hexane and allyl chloride vapors and removed by way of a separator. 6½ hours after the addition of the alkali has been completed, the boiling temperature of the mixture has risen to 74.5°C, whereupon it is lowered to 72°C by adding another 25 ml of hexane.

The precipitated common salt is filtered out and washed with benzene. The residue obtained after the wash benzene has been distilled off is combined with the filtered mixture and the whole is distilled under vacuum. 336.5 g of crude N-allyltrimethylcaprolactam pass over at 120° to 136°C and 0.4 mm Hg. 20 g of unconverted trimethylcaprolactam are recovered as the last fraction. The rectification of the main distillate in a 1-meter Vigreux column yields the following fractions:

| | Boiling point | $n_D 20$ | Amount | Gas chromatography % Allyl-lactam | % Lactam |
|---|---|---|---|---|---|
| First runnings | 110–1°C/0.5 mm Hg | 1.4799 | 5.3 g | 83.9 | 1.7 |
| Main fraction | 111–7°C/0.5 mm Hg | 1.4816 | 262.0 g | 93.2 | 6.8 |
| Last runnings | 117–129°C/0.5 mm Hg | | 31.5 g | 91.0 | 9.0 |
| Residue | — | m.p=77–81°C | 30.9 g | 2.5 | 95.8 |

In all, 71 g of the lactam are not converted and 278 g of N-allyltrimethylcaprolactam are formed. The lactam conversion is consequently 77% and the yield of N-allyllactam is 92.5% of the theoretical based on lactam consumed.

By further rectification, a 99.9% N-allyltrimethylcaprolactam ($n_D^{20}$ = 1.4803) can be obtained and shows the following analytical values.

found: C 73.88%; H 10.52%; N 7.35%
calculated: C 73.79%; H 10.84%; N 7.17%

EXAMPLE 7

To 226 g (2 mols) of caprolactam and 304 g (2.4 mols) of benzyl chloride is added an amount of hexane such that the mixture boils at 74°C. While stirring vigorously, 80 g (2 mols) of sodium hydroxide pellets are added within 6 minutes at this temperature, whereupon the heat of reaction liberated causes the hexane present to boil violently. Thereafter, heating is carried out for 8 hours under reflux with continued stirring. Since, during this process the boiling point of the mixture falls, part of the hexane used is distilled off so that the temperature never falls below 70°C. When the reaction is completed, 29 ml of water which has been driven off with the hexane vapor has collected in a separator arranged below the reflux condenser.

The residual hexane is distilled off from the mixture, the sump temperature being increased to 140°C. In order to prevent the product solidifying during the cooling, dilution with 300 ml of benzene is carried out. The precipitated sodium chloride is thereafter filtered out and washed with benzene. After the wash benzene has been distilled off, the residue is fractionated under vacuum. After a liquid first fraction, two solid fractions pass over and these have the following properties and the following compositions determined by gas chromatography:

| B.p. | M.p | Amount | % N-benzyl-caprolactam | % Caprolactam |
|---|---|---|---|---|
| 120–137°C/0.1 mm Hg | about 40°C | 124.3 g | 73.0 | 10.9 |
| 134–163°C/0.1 mm Hg | 53–55°C | 265.1 g | 86.9 | — |

The yield of N-benzylcaprolactam calculated from the analytical data is 79% of the theoretical yield based on the lactam used. After being recrystallized three times from petroleum ether, the product of the second fraction is pure and melts at 56.5° – 57.5°C.

EXAMPLE 8

To 170 g (2 mols) of pyrrolidone and 303 g (2.4 mols) of benzyl chloride there is added an amount of hexane such that the mixture boils at 70°C. 80 g (2 mols) of sodium hydroxide in pellet form are added in portions within a quarter of an hour. Heating is carried out for 4 hours under reflux while stirring vigorously. 33 ml of water are separated from the evaporating hexane in a connected separator.

Finally, the hexane used is distilled off directly from the reaction mixture, the sump temperature being increased to 152°C. Thereafter, the precipitated sodium chloride is filtered out and washed with benzene. After the wash benzene has been distilled off, the filtered mixture is rectified in a 1-meter Vigreux column at 0.6 mm Hg, the following fractions being separated:

| B.p. | $n_D 20$ | Amount | Gas chromatography % Pyrrolidone | % N-benzyl-pyrrolidone |
|---|---|---|---|---|
| 33–132°C/0.6 mm Hg | 1.5352 | 66.3 g | First fraction | |
| 136–38°C/0.6 mm Hg | 1.5507 | 63.4 g | 0.4 | 92.7 |
| 138–40°C/0.6 mm Hg | 1.5510 | 230.5 g | — | 99.6 |

Consequently, 288 g of N-benzylpyrrolidone are formed in all. This is 82.5% of theoretical based on pyrrolidone used.

EXAMPLE 9

To a mixture of 113 g (1 mol) of caprolactam and 280.4 g of commercial, approx. 90%, octadecyl bromide (about 0.8 mol) there is added an amount of hexane such that the mixture boils at 75°C. After adding 40 g (1 mol) of sodium hydroxide beads, the mixture is boiled under reflux for 7 hours while stirring vigorously. In the process, the boiling temperature falls slowly to 70°C. In all, 12 ml of water are expelled with the hexane vapors and removed by a separator.

The precipitated sodium bromide is filtered out and washed with benzene. The filtered solution of the mixture in 400 ml of benzene so obtained is extracted five times with 250 ml of water in each case. By concentration and distillation of the combined aqueous extracts, 21 g of unconverted caprolactam are recovered. After evaporation of the organic phase, 291 g of crude, wax-like N-octadecylcaprolactam are obtained (yield: 100% based on octadecyl bromide used, 98.5% based on caprolactam consumed). On the distillation of this product under 0.5 mm Hg, a main fraction of 226 g passes over at 231° to 235°C. The purified N-octadecylcaprolactam obtained in this way is slightly yellow in color and melts at 35.5° – 37.5°C. Yield: 77.5% based on octadecyl bromide used, 76.5%, based on caprolactam consumed.

What is claimed is:

1. A process for the preparation of N-substituted lactams of the formula

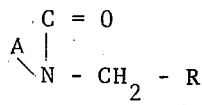

wherein A is a substituted or unsubstituted aliphatic hydrocarbon chain having 3 to 11 carbon atoms, said substituents comprising one or more alkyl groups each having 1 to 4 carbon atoms; and R is hydrogen or a hydrocarbon radical having 1 to 17 carbon atoms, comprising reacting at least one starting lactam of the formula

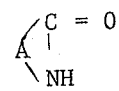

with an organic halogen compound of the formula
X — CH$_2$—R
wherein X is chlorine, bromine or iodine, in the presence of an alkali metal hydroxide, in solid form or in aqueous solution containing at least 50% of said hydroxide, at a reaction temperature of from 20°C to 120°C.

2. A process according to claim 1 wherein R is hydrogen, straight chain alkyl having 1 to 17 carbon atoms, or aralkyl.

3. A process according to claim 1 wherein one mol of said starting lactam is reacted with 0.5 to 5 mols of said halogen compound and with 0.5 to 2 mols of said alkali metal hydroxide.

4. A process according to claim 1 carried out in the absence of solvent.

5. A process according to claim 1 wherein there is present 0.1 to 1.0 parts by weight of an organic liquid per part by weight of said starting lactam, said organic liquid taken from the class consisting of aliphatic, cycloaliphatic and aromatic hydrocarbons and aliphatic and cycloaliphatic ethers and being immiscible with water and boiling between 20° and 120°C.

6. A process according to claim 1 wherein said alkali metal hydroxide is sodium hydroxide.

7. A process according to claim 5 wherein said organic liquid boils at said reaction temperature.

8. A process according to claim 1 wherein said alkali metal hydroxide is added to a previously prepared mixture comprising said starting lactam and said halogen compound.

9. A process according to claim 1 wherein said halogen compound is gaseous.

10. A process according to claim 1 wherein said halogen compound is allyl chloride, benzyl chloride, methyl chloride or ethyl chloride.

11. A process according to claim 9 wherein said reaction is carried out under such pressure that said halogen compound just boils out of the reaction mixture at said reaction temperature.

12. A process according to claim 1 wherein said starting lactam is caprolactam.

13. A process according to claim 1 wherein said reaction temperature is from 50° to 80°C.

14. A process according to claim 1 wherein one said starting lactam, having a melting point above said reaction temperature, is combined with a lower melting starting lactam to form a starting lactam, mixture melting at or below said reaction temperature, whereby a plurality of said N-substituted lactams are formed.

15. A process according to claim 14 wherein said plurality of said N-substituted lactams are separated by distillation.

* * * * *